United States Patent [19]
Lofquist et al.

[11] Patent Number: 5,269,380
[45] Date of Patent: Dec. 14, 1993

[54] SEED PLANTER DEPTH GAUGE WHEEL WITH MUD SCRAPER

[75] Inventors: Donald B. Lofquist; Steven L. Lofquist, both of Elwood, Nebr.

[73] Assignee: Lofquist Welding, Inc., Elwood, Nebr.

[21] Appl. No.: 826,429

[22] Filed: Jan. 27, 1992

[51] Int. Cl.⁵ ............... A01B 15/16; A01B 23/06
[52] U.S. Cl. ...................... 172/558; 172/559; 172/610; 111/135; 111/164
[58] Field of Search ............... 111/135, 136, 164, 137, 111/194; 172/558–564, 610; 280/585, 856

[56] References Cited

U.S. PATENT DOCUMENTS

| | | |
|---|---|---|
| 365,408 | 6/1887 | Rodenberger . |
| 393,390 | 11/1888 | Patric .................... 111/194 |
| 787,016 | 4/1905 | Wimer . |
| 806,826 | 12/1905 | McQuillin . |
| 819,533 | 5/1906 | Fowler . |
| 935,297 | 9/1909 | Olevenger . |
| 1,074,763 | 10/1913 | Wills . |
| 1,457,960 | 6/1923 | Britten . |
| 2,155,739 | 4/1939 | Seaholm .................... 172/558 |
| 2,442,727 | 6/1948 | Hyland . |
| 2,902,954 | 9/1959 | Stilwell .................... 111/52 |
| 2,949,968 | 8/1960 | Stoner .................... 172/558 |
| 4,009,668 | 3/1977 | Brass et al. ............... 172/559 |
| 4,206,817 | 6/1980 | Bowerman ............... 172/559 |
| 4,603,746 | 8/1986 | Swales .................... 172/559 |
| 4,977,841 | 12/1990 | Truax .................... 111/164 |

FOREIGN PATENT DOCUMENTS

| | | | |
|---|---|---|---|
| 345899 | 12/1989 | European Pat. Off. ......... 172/610 |
| 214690 | 8/1967 | Sweden .................... 172/561 |
| 59057 | 12/1911 | Switzerland ............... 172/561 |

OTHER PUBLICATIONS

John Deere Fertilizer Grain Drill, Model "FB-A" Owners Manual, Apr. 1956, pp. 10–11.

Primary Examiner—Randolph A. Reese
Assistant Examiner—Spencer Warnick
Attorney, Agent, or Firm—Zarley, McKee, Thomte, Voorhees & Sease

[57] ABSTRACT

A mud scraper assembly includes a scraper blade mounted on the lower end of a scraper arm which in turn has a clamp at its upper end mounted on the sleeve of a depth gauge wheel support arm. No alteration of existing planter structure is required for adapting the mud scraper assembly to a Deere Max-Emerge planter and planters having generally the same structure. An adjustment screw is provided on the clamp for engaging the wheel support arm at a point remote to the shaft axis on which it is mounted to pivot the scraper arm into close proximity with the depth gauge wheels as needed.

12 Claims, 2 Drawing Sheets

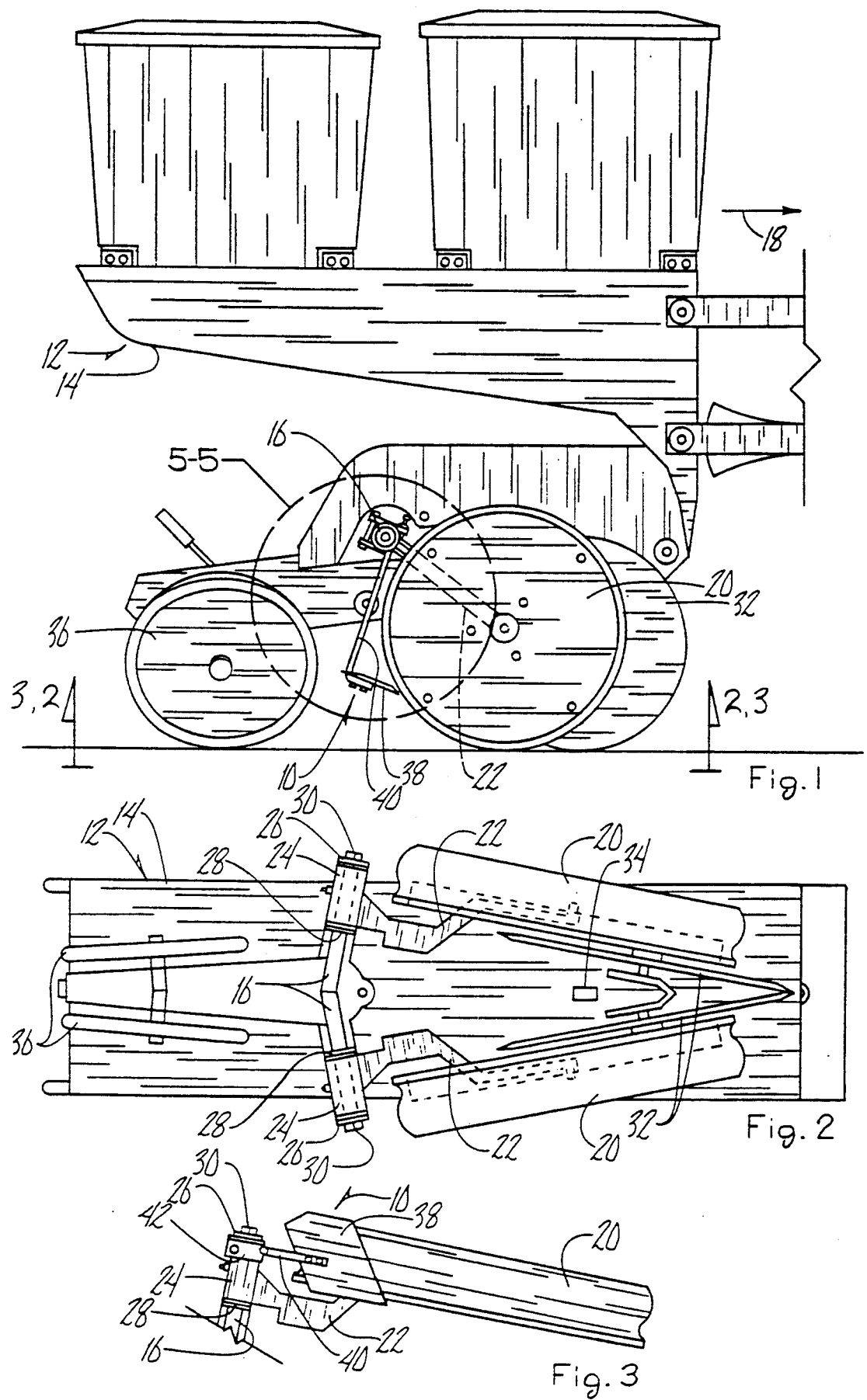

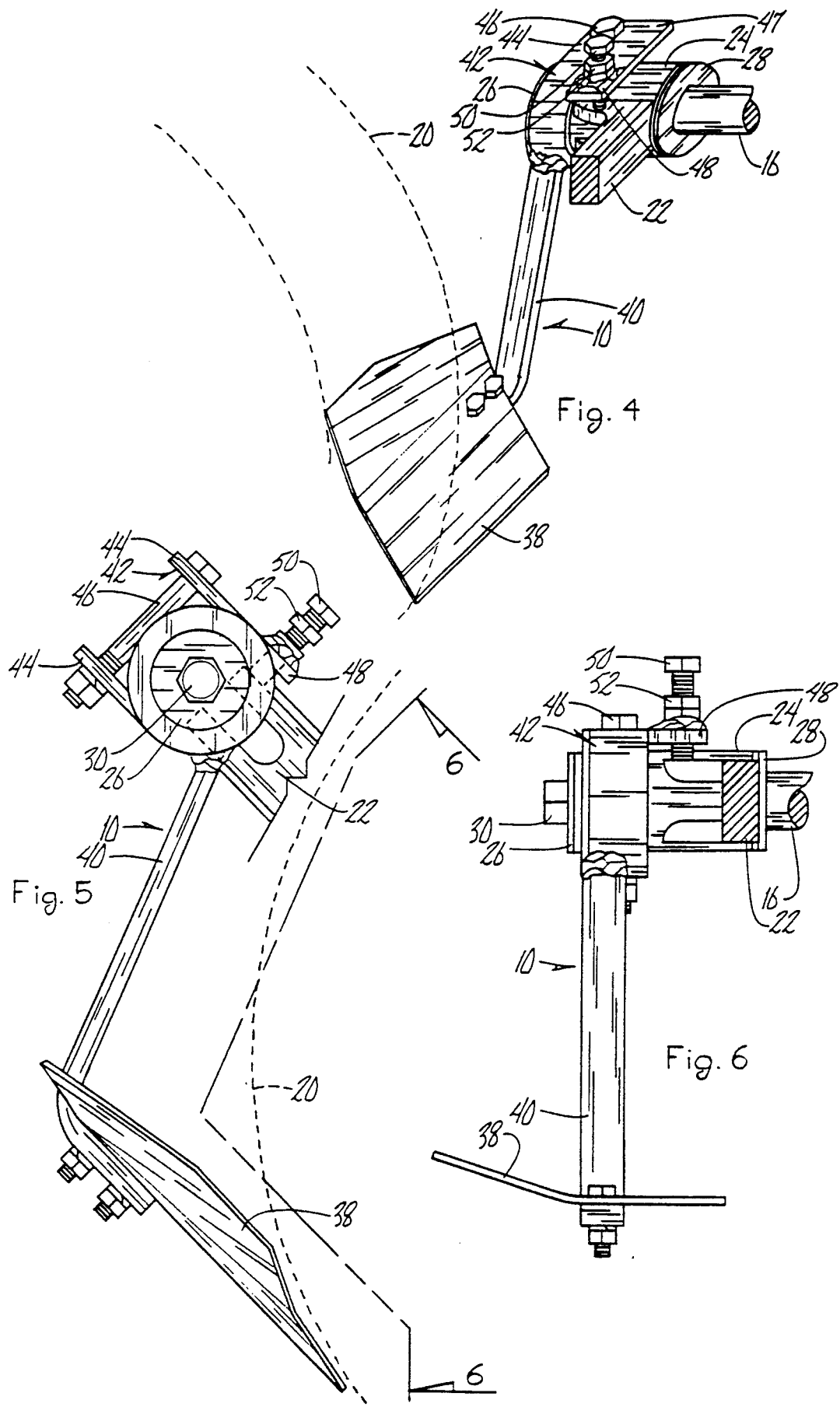

SEED PLANTER DEPTH GAUGE WHEEL WITH MUD SCRAPER

BACKGROUND OF THE INVENTION

The typical corn planter such as the Deere Max-Emerge 7100 and 7300 planters will have for each row a pair of disks position in a V to cut a seed groove in the ground. A depth gauge wheel is positioned closely adjacent each disk to limit the depth of the seed groove cut by the disks. A pair of packer wheels close the seed groove after seed has been delivered to the groove from a seed tube positioned behind the disks.

A problem that occurs in damp conditions is that mud will build up on the depth gauge wheels which causes the seed groove disks to be raised out of the ground making for an inconsistent seed groove depth. While wheel scrapers in general are known one is needed that will readily mount on seed planters in current use such as the Deere planter.

SUMMARY OF THE INVENTION

On some seed planters such as the Deere planter a transverse support shaft is provided for each pair of depth gauge wheels. The wheel support arms are mounted on this shaft through a sleeve connection on the upper end of the wheel support arm. The mud scraper assembly of this invention includes a mud scraper mounted on the lower end of an arm having a clamp at its other end embracing the depth gauge wheel support arm sleeve. The clamp is locked in place on the sleeve but fine rotational adjustment is possible through a bolt carried on the clamp positioned to engage the wheel support arm at a point remote to the shaft axis whereby bolt pressure on the wheel arm causes the mud scraper assembly to rotate about the shaft axis for positioning the scraper closely adjacent the peripheral exterior surface of the depth gauge wheel.

DESCRIPTION OF THE DRAWINGS

FIG. 1 is a fragmentary side elevation view of a Deere planter including the mud scraper assembly of this invention.

FIG. 2 is a view taken along line 2—2 in FIG. 1.

FIG. 3 is a view similar to FIG. 2 but showing additionally the mud scraper assembly in its operative position of use.

FIG. 4 is a fragmentary perspective view of the mud scraper assembly mounted on the depth gauge wheel arm.

FIG. 5 is an enlarged view of the mud scraper assembly as indicated by the line 5—5 in FIG. 1.

FIG. 6 is a view taken along line 6—6 in FIG. 5.

DESCRIPTION OF PREFERRED EMBODIMENT

The mud scraper assembly of this invention is referred to generally in FIG. 4 by the reference numeral 10 and is shown in FIG. 1 mounted on a planter 12. The planter 12 is a Deere Max-Emerge planter having a frame 14 which carries a pair of shaft portions 16 extending laterally of the direction of travel as indicated by the arrow 18. Depth gauge wheels 20 are mounted on support arms 22 which in turn include sleeves 24 in which the shafts 16 are received. Washers 26 and 28 are mounted at opposite ends of the sleeves 24 and a bolt 30 in the shaft 16 engages the outer washers 26 to hold the sleeves in place. A pair of seed groove opener disks 32 are arranged in a V-shape and are positioned on the inside faces of the depth gauge wheels 20. A seed delivery tube 34 is positioned between the discs for dropping seed into a groove formed by the disks 32. A pair of packer wheels 36 follow the depth gauge wheels 20 behind the shafts 16 to close the seed groove.

The mud scraper assembly 10 includes a scraper blade 38 at the lower end of a support arm 40 which in turn is connected to a U-shaped clamp 42. The clamp 42 has spaced apart clamp portions 44 through which a lock bolt 46 extends to lock the clamp 42 on the sleeve 24 as seen in FIG. 5. As seen in FIG. 4, the upper clamp portion 47 includes a portion 48 which extends over the depth gauge wheel arm 22 such that an adjustment bolt 50 carried by the portion 48 engages the arm 22 remotely of the axis of shaft 16 whereby pressure on the arm 22 will cause the clamp 42 to rotate about the axis 16 thereby moving the scraper blade 38 into close proximity of the exterior peripheral surface of the wheel 20 as seen in FIG. 5. A lock nut 52 is provided on the adjustment bolt 50 to lock the bolt 50 in place once a setting has been made. As shown in FIG. 4, the portion 48 of clamp portion 47 and the adjustment bolt 50 inherently function as a stop for limiting rotation of the clamp 42 relative to the sleeve 24.

Thus in operation it is seen that no alteration of the existing planter structure need be made to accommodate the mud scraper assembly 10 of this invention. The mud scraper is simply mounted on the existing depth gauge wheel support arm at its sleeve end which is carried on the shaft 16. The mud scraper arm 40 is locked in place by tightening the bolt 46. Fine adjustment of the scraper relative to the wheel 20 is made by operation of the adjustment bolt 50 from time to time as the cutting edge of the scraper blade 38 will wear and need to be repositioned closer to the wheel 20.

It is understood that this invention is not intended to be limited to the Deere Max-Emerge planter but will adapt to other planters having a generally similar structure.

What is claimed is:

1. A depth gauge wheel assembly comprising,
   a support shaft on which a sleeve on one end of an arm is mounted, said arm having a depth gauge wheel mounted on its other end,
   a mud scraper assembly including a clamp mounting means at one end connected to said sleeve, an arm extending from said clamp mounting means and including a scraper means positioned closely adjacent said wheel for removing mud on said wheel,
   said clamp mounting means being U-shaped with spaced apart clamp elements extending from said clamp arm on opposite sides of said sleeve, and a bolt means interconnecting the free ends of said clamp elements, and
   one of said clamp elements including a portion extending parallel to said wheel arm, an adjustment bolt being carried on said portion and positioned to engage said wheel arm at a point remote to the axial center of said shaft whereby pressure on said wheel arm by said adjustment bolt causes said clamp to rotate relative to said sleeve and allows said scraper to be closely positioned adjacent to said wheel.

2. The structure of claim 1 wherein said wheel includes an exterior peripheral surface and said scraper means is positioned to clean said peripheral surface.

3. The structure of claim 2 wherein said scraper assembly is connected to said depth gauge wheel assembly to move as an integral unit whereby the scraper means remains in a consistent relationship with said wheel peripheral surface.

4. The structure of claim 1 and seed groove cutting discs are mounted closely adjacent said depth wheel.

5. The structure of claim 4 and a pair of packer wheels are positioned rearwardly of said depth gauge wheel and said discs to close a seed groove formed by said cutting discs.

6. The structure of claim 5 and a seed tube is positioned to place seed in said seed groove.

7. The structure of claim 1 wherein said shaft includes a pair of depth gauge wheel assemblies in lateral spaced relationship and mud scraper assemblies on each wheel assembly, a pair of seed groove cutting discs positioned between said wheel assemblies, and a seed delivery tube positioned to place seed in a groove made by said discs.

8. A multiple row seed planter comprising,
a frame from which a transversely extending shaft is positioned for each row,
a pair of wheel support arms each having a sleeve on one end on each shaft with depth gauge wheels on their other free ends,
a pair of seed groove cutting discs positioned closely adjacent each pair of gauge wheels,
packer wheel means positioned behind said depth gauge wheels,
a seed delivery tube positioned to deliver seed into a seed groove,
a mud scraper assembly including a clamp mounting means at one end connected to each of said sleeves, an arm extending from said clamp mounting means and including a scraper means positioned closely adjacent said wheel for removing mud on said wheel,
said clamp mounting means being U-shaped with spaced apart clamp elements extending from said clamp arm on opposite sides of said sleeve, and a bolt means interconnecting the free ends of said clamp elements, and
one of said clamp elements including a portion extending parallel to said wheel arm, an adjustment bolt carried on said portion and positioned to engage said wheel arm at a point remote to the axial center of said shaft whereby pressure on said wheel arm by said adjustment bolt causes said clamp to rotate relative to said sleeve and allows said scraper to be closely positioned adjacent to said wheel.

9. A mud scraper assembly comprising,
an arm having a scraper means at one end and a mounting means at the other end adapted to engage a support shaft means for relative adjustment rotation about the shaft, and
an adjustment bolt on said mounting means offset from a lateral axis of said mounting means and positioned to engage a fixed portion of a depth gauge wheel support arm remotely of said shaft to closely position said scraper means next to the peripheral surface of a depth gauge wheel.

10. A multiple row seed planter comprising,
a frame from which a transversely extending shaft is positioned for each row,
a pair of wheel support arms each having a sleeve on one end on each shaft with depth gauge wheels on their other free ends,
a pair of seed groove cutting discs positioned closely adjacent each pair of gauge wheels,
packer wheel means positioned behind said depth gauge wheels,
a seed delivery tube positioned to deliver seed into a seed groove,
a mud scraper assembly including a clamp mounting means at one end connected to each of said sleeves, an arm extending from said clamp mounting means and including a scraper means positioned closely adjacent said wheel for removing mud on said wheel, and
said clamp mounting means being U-shaped with spaced apart clamp elements extending from said clamp arm on opposite sides of said sleeve, and a bolt means interconnecting the free ends of said clamp elements.

11. A mud scraper assembly comprising,
an arm having a scraper means at one end and a mounting means at the other end adapted to engage a support shaft means for relative adjustment rotation about the shaft, and
a stop means on said mounting means offset from a lateral axis of said mounting means and positioned to engage a fixed portion of a depth gauge wheel support arm remotely of said shaft to limit rotational movement of said scraper means away from the peripheral surface of a depth gauge wheel.

12. A depth gauge wheel assembly comprising,
a support shaft on which a sleeve on one end of an arm is mounted, said arm having a depth gauge wheel mounted on its other end,
a mud scraper assembly including a clamp mounting means at one end connected to each of said sleeves, an arm extending from said clamp mounting means and including a scraper means positioned closely adjacent said wheel for removing mud on said wheel,
said clamping mounting means being U-shaped with spaced apart clamp elements extending from said clamp arm on opposite sides of said sleeve, and a bolt means interconnecting the free ends of said clamp elements, and
one of said clamp elements including a portion extending parallel to said wheel arm, a stop means carried on said portion and positioned to engage said wheel arm at a point remote to the axial center of said shaft whereby pressure on said wheel arm by said stop means limits rotation of said clamp relative to said sleeve for maintaining said scraper closely positioned adjacent to said wheel.

* * * * *